United States Patent

[11] 3,569,859

[72] Inventor Wayne T. Whitney
 Oxon Hill, Md.
[21] Appl. No. 790,684
[22] Filed Jan. 13, 1969
[45] Patented Mar. 9, 1971
[73] Assignee The United States of America as represented by the Secretary of the Navy

[54] LASER SYSTEM OPERABLE AT DIFFERENT WAVELENGTHS
3 Claims, 4 Drawing Figs.

[52] U.S. Cl. ................................................ 331/94.5
[51] Int. Cl. ................................................ H01s 3/10, H01s 3/22, H01s 3/02
[50] Field of Search .................................... 331/94.5

[56] References Cited
UNITED STATES PATENTS
3,333,101 7/1967 Bell .............................. 331/94.5X

OTHER REFERENCES

Wright, " Enhancement of Second Harmonic Power Generated by a Dielectric crystal inside a laser cavity", Proc. IBBB, 51, (11) Nov. 1963, p 1663

Panizza, " Two Phaton Absorbtion in ZmS," app. Phys. Lett. 10, (10), 15 May 1967 pp 265— 6

Moore, " Gas Laser Frequency Selection by Molecular Absorbtion," Applied Optics, 4, (2), Feb. 1965, pp 252— 3.

Primary Examiner—Ronald L. Wibert
Assistant Examiner—R. J. Webster
Attorneys—R. S. Sciascia, A. L. Branning and M. L. Crane ABSTRACT: This disclosure is directed to a carbon dioxide laser which is modified to operate at a wavelength of 9.6 microns rather than at the normal wavelength of 10.6 microns. This modification is brought about by placing a selectively absorbing material within the cavity which allows the 9.6 micron transitions to dominate without any realignment of the laser cavity.

Patented March 9, 1971

3,569,859

INVENTOR
WAYNE T. WHITNEY
BY *Melvin L. Crane* AGENT
*[signature]* ATTORNEY

LASER SYSTEM OPERABLE AT DIFFERENT WAVELENGTHS

The invention described herein may be manufactured and used by or for the Government of the United States of America for governemntal purposes without the payment of any royalties thereon or therefor.

BACKGROUND OF THE INVENTION

This invention relates to a laser which may operate at more than one frequency, and more specifically to a carbon dioxide laser.

Heretofore, carbon-dioxide-type laser cavities have been used which contain the usual sealed end windows at the appropriate Brewster angle with reflective mirrors positioned a specific distance from the windows. Other $CO_2$ lasers have been developed which make use of wave length-dispersing devices such as gratings or prisms with separate mirrors placed at specific angles relative to the axis of the cavity. Such laser cavities are inefficient, cumbersome to use, and require specific alignment of the individual elements.

SUMMARY OF THE INVENTION

This invention is directed to a carbon dioxide laser cavity which may be operable in the 9.6 micron wavelength rather than the 10.6 micron wavelength during normal operation. A carbon dioxide laser cavity normally operable at 10.6 microns wavelength is modified by including within the laser cavity a suitable material, such as a polycrystalline zinc sulfide window, which selectively absorbs 10.6 micron radiant energy. The window when placed in the cavity abosrbs radiant energy such that the 9.6 micron transistions oscillate in preference to the 10.6 micron band because of greater abosrption loss at 10.6 microns.

It is therefore the object of the present invention to provide a means by which the output wavelength of a carbon dioxide laser may be changed by selective abosrption of radiant energy without changing the alignment of the laser cavity.

BRIEF DESCRIPTION OF THE INVENTION

Figure 1:
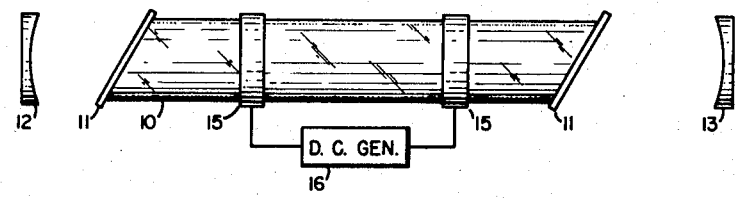
FIG. 1 illustrates a diagrammatic view of a prior art gas laser.

Now referring to the drawing wherein the same reference characters represent like parts, there is shown by illustration a gas laser comiprisng a cylindrical tube 10 made of quartz or any other suitable material. The tube can include end windows 11 sealed at the appropriate Brewster angle in order to decrease reflcetive losses and to permit a high gain per pass of the light beam resulting in a higher power output. Mirrors 12 and 13 are positioned opposite the ends of the tube with the center of the mirrors on the axis of the tube. The mirrors are preferably coated so as to provide maximum reflectance at the emitted wavelength; however, broadband mirrors may be utilized to obtain more than one emitted frequency. One mirror is not fully reflective to permit transmittance of approximately 20 percent of the incident light while reflecting the other 80 percent in order to bring about continuous laser action. The mirrors are preferably separated by a distance equal to an even multiple of the wavelength of operation, thereby providing the desired cavity effect. The laser is shown with spaced electrically conductive bands 15 coaxial with the tube. The bands are shown connected with a direct current generator 16 which excites the laser discharge. The tube could be excited by any other well-known means such as by a radio frequency.

The culindrical tube is filled with a gas mixture, of a lasing gas such as carbon dioxide mixed with one of the gases selected from a group of gases such as: nitrogen, carbon monoxide, water vapor, helium, xenon, or mixtures of gases selected from the group. As an example for operation of a helium-carbon dioxide gas mixture tube, the gas mixture by volume includes 70 percent helium and 30 percent carbon dioxide at a pressure of 17 torr (mm. of mercury). Such a laser cavity will emit frequencies at a wavelength of 10.6 microns.

Figure 2:
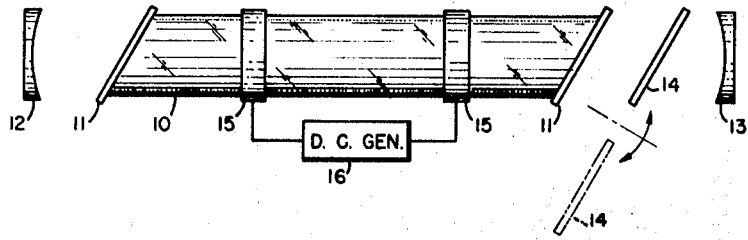
FIG. 2 illustrates a gas laser made according to the teaching of the present invention.

FIG. 2 illustrates a gas laser made in accordance with the teaching of this invention. As shown, the laser system includes the elements described above for the prior art laser system with the addition of a hot pressed polycrystalline zinc sulfide window 14 having a thickness of about 2 mm. which is placed within the cavity such that the rediant energy reflecting back and forth passes through the polycrystalline window 14. As shown, the window 14 is placed at the Brewster angle in order to decrease reflective losses and to permit a high gain per pass of the light beam. As shown, the window 14 is shown in dotted line outside of the laser cavity. Thus, the window 14 may be moved into or out of the cavity. When the window 14 is in place within the laser cavity, the laser operates at 9.6 microns, when not in the cavity, the laser operates at 10.6 microns.

Figure 3:
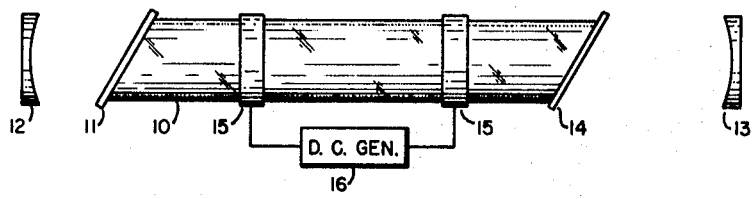
FIGS. 3 and 4 are modifications of the device shown in FIG. 2.

FIG. 3 illustrates a gas laser such as described above, however, the polycrystalline zinc sulfide window 14 is shown as one of the end windows of the gas tube. In this modification, the window 14 is fixed in place; therefore, the laser cavity will operate only at 9.6 microns.

Figure 4:
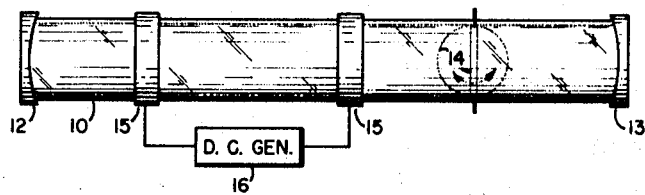

FIG. 4 illustrates a further midification which shows the polycrystalline zinc sulfide window 14 positioned within the gas tube between the two end windows. As shown, the zinc sulfide window 14 may be positioned across the axis such that the radiant energy oscillates through the zinc sulfide window. In this position, the laser will operate at 9.6 microns. The window 14 may be rotated 90° to align with the axis of the tube. In this position, the laser will operate at 10.6 microns since the radiant energy does ont oscillate through the zinc sulfide window.

As seen by the above illustrations, the zinc sulfide window may be positioned at different positions within the laser cavity to change the normal operation at 10.6 microns to that of 9.6 microns.

In operation of the tube set out by example above, the tube normally operates at a wavelength of 10.6 microns. The zinc sulfide window is placed in the cavity in the light path such that all of the light must pass through the zinc sulfide window during oscillations between the mirror surfaces. The zinc sulfide window absorbs the light such that there are greater abosrption losses at the 10.6 micron band than at the 9.6 micron band; therefore, the laser cavity allows the 9.6 micron transitions to oscillate in preference to the 10.6 micron transitions. By mounting the zinc sulfide window such that it may be moved into and from the light path, the $CD_2$ laser cavity may be operated either at a wavelength of 10.6 microns or at 9.6 microns. Such a system may have use in communications as well as other well known uses.

The zinc sulfide window as shown in FIG. 2 is positioned between one of the tube windows and the mirror. It has been determined that the zinc sulfide window may replace one of the end windows as shown in FIG. 3 or either be included within the cavity somewhere between the end mirrors. If used as one of the windows closing the tube, the tube would operate only in the 9.6 micron band. When placed within the cavity, the zinc sulfide window may be mounted for rotation. Thus, the zinc sulfide window could be positioned within the cavity in the light path for operation at 9.6 microns and rotated to lie along the axis for operation in the 10.6 micron band. Thus, the $CO_2$ laser may be operated at a wavelength of 10.6 microns or at 9.6 microns depending on whether or not the zinc sulfide wondow is placed within the cavity such that the radiant energy oscillates through the zinc sulfide window.

The invention has been directed to the use of a carbon dioxide laser modified by use of a hot pressed polycrystalline zinc sulfide crystal. The invention is also applicable to other multiwavelength lasers including mitrous oxide operable with a suitable selective absorber which may include a confined gas placed into the cavity. The selective absorber when placed in the cavity causes operation at a different wavelength because of greater absorption at the original wavelength.

Obviously many modifications and variations of the present invention are possible in the light of the above teachings. It is therefore to be understood that within the scope of the appended claims the invention may be practiced otherwise than as specifically described.

I claim:

1. A laser cavity system for generation of coherent beams of radiation comprising:

a plasma tube including end windows;

said tube containing a gas or imxture of gases exhibiting laser action at two or more different wavelengths including one noraml wavelength of emission;

means for exciting the gas or gas mixture within said tube to produce laser action;

a reflector disposed opposite each end of said tube for resonating energy emitted from said gas or gas mixture;

one of said reflectors being totally reflective and the other reflector being partially reflective whereby radiant energy passes through said partially reflective reflector;

a zinc sulfide window, support means secured to said zinc sulfide window for supporting said zinc sulfide window within said laser cavity between said reflectors, said support means provided for aligning said zinc sulfide window along the axis of said laser cavity for said normal wavelength of operation of said laser and for alignnig said zinc sulfide window across the axis of said cavity for operation of said laser at one of said wavelengths different from said normal wavelength of operation.

2. In a laser cavity system as claimed in claim 1; wherein, said gas or mixture of gases comprises $CO_2$ with a normal wavelength of operation of 10.6 microns and with another wavelength of operation of 9.6 microns with said zinc sulfide window positioned across the axis of said cavity.

3. In a laser cavity as claimed in claim 2; wherein, said zinc sulfide window is positioned within the confines of said tube between said end windows of said closed tube.